EPHRAIM B. TALBOTT, OF KNOXVILLE, TENNESSEE.

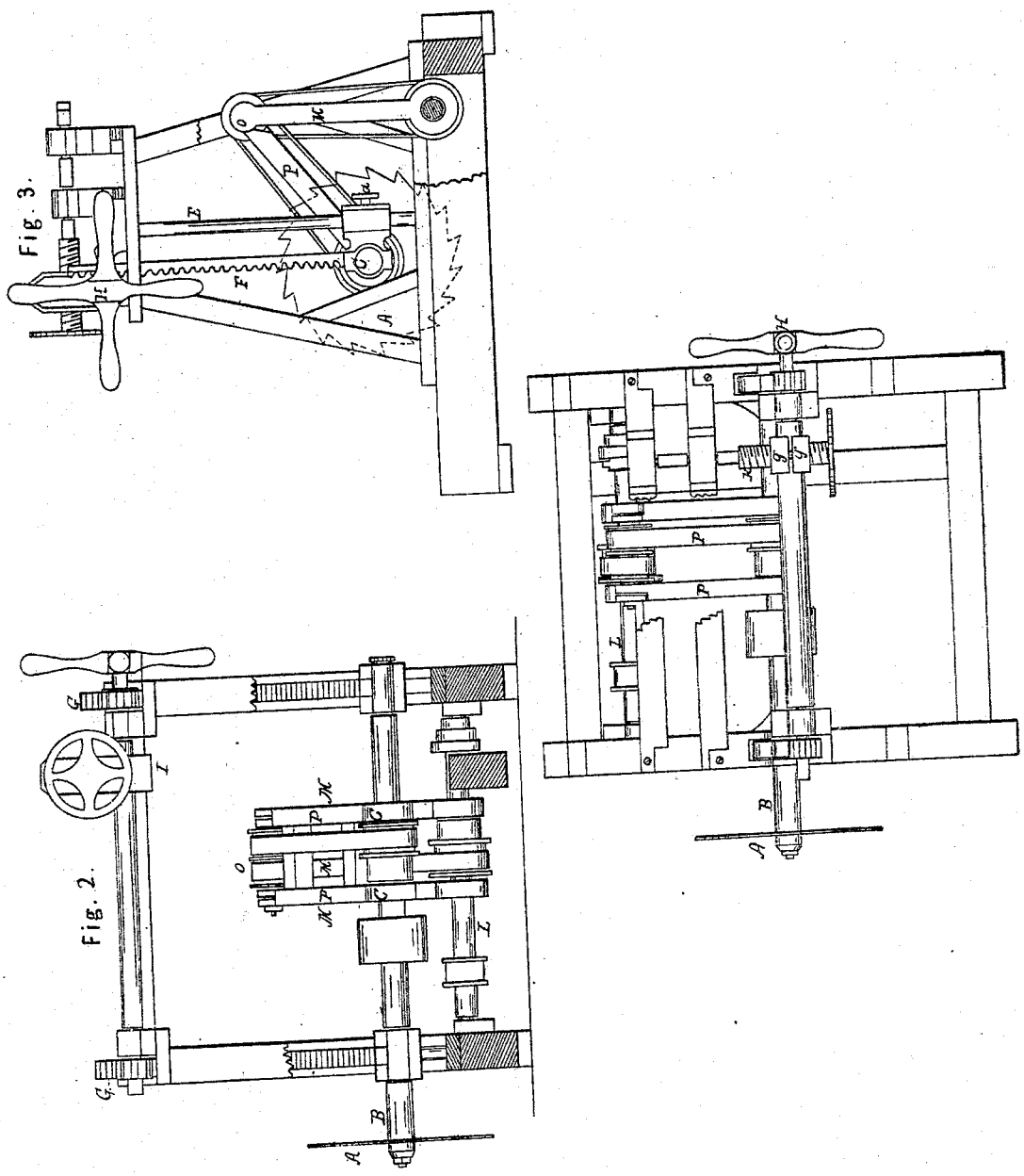

Letters Patent No. 89,518, dated April 27, 1869.

IMPROVEMENT IN SAW-MILL.

The Schedule referred to in these Letters Patent and making part of the same.

*To all whom it may concern:*

Be it known that I, EPHRAIM B. TALBOTT, of Knoxville, in the county of Knox, and State of Tennessee, have invented a new and valuable Improvement in the Gearing of a Saw, that it may be shifted up or down; and I do hereby declare that the following is a full, clear, and exact description of the construction and operation of the same, reference being had to the annexed drawings, making a part of this specification, and to the letters and figures of reference marked thereon.

The nature of my invention consists in constructing a mill with a circular saw, for lumbering-purposes, by which a small motor may be made to serve all the purposes of a large saw and large motor, except that the work will be performed less rapidly.

This result is accomplished by adjusting the saw in such manner that it may be raised or lowered at the will of the operator, and passed twice or more through the log on the same line.

Letter A, of the drawings, represents the saw; and Letter B, the saw-mandrel.

The letters C are arbors for the mandrel-shaft, connected with and adjusted to the standards E, and the racks F, in the manner shown.

These arbors are arranged to slide up and down on the standards E, by means of said rack F, and the pinions working therein, marked G.

These pinions are operated, and the saw and mandrel-shaft moved, either up or down, by the windlass H, to which said pinions are attached.

The letter I represents two clamps, set one on each side of the windlass-shaft, and through which is passed a screw, K, adjusted as shown, the office of which said screw and clamps is to enable the operator to fix and hold the mandrel-shaft and saw in any position, as to altitude, he may desire.

The set-screws a, adjusted in the blocks that slide up and down on the standards E, are also used in connection with said clamps and screw for adjusting the height of the saw, and holding it firmly in place.

The letter L is the driving-shaft, arranged in the manner shown.

The frame m passes upward from the driving-shaft to a convenient height, and in the top thereof I adjust the short shaft O.

Another frame, marked P, pivoted on shaft O, extends from said shaft to the mandrel of the same, around which it is clasped by both arms.

These last-named frames, in conjunction with said shafts, and the pulleys and belts attached thereto, as represented, afford means by which the motive-power will always act upon the same shaft with the same force, without regard to the angle at which the same shaft may be adjusted with the driving-shaft.

These devices combined, enable the operator to pass the saw through the log as many times as he chooses on the selfsame longitudinal line, and to raise and lower the saw at will.

This arrangement is found extremely useful when only a small motive-power can be obtained, and the logs to be sawed are large. It is also useful in cutting crooked logs, and generally in all lumber-manufacture, where, for any reason, one movement of the saw through the log will not cut off the board both at top and bottom.

What I claim as my invention, and desire to secure by Letters Patent, is—

The arrangement, herein described, of the mandrel B, standards E, racks F, pinion G, clamp I, shaft L, and arms P and m, when all the parts are constructed and operate as specified.

In testimony that I claim the above, I have hereunto subscribed my name, in the presence of two witnesses.

EPHRAIM B. TALBOTT.

Witnesses:
E. W. ADKINS,
W. A. HENDERSON.